Figure 1:
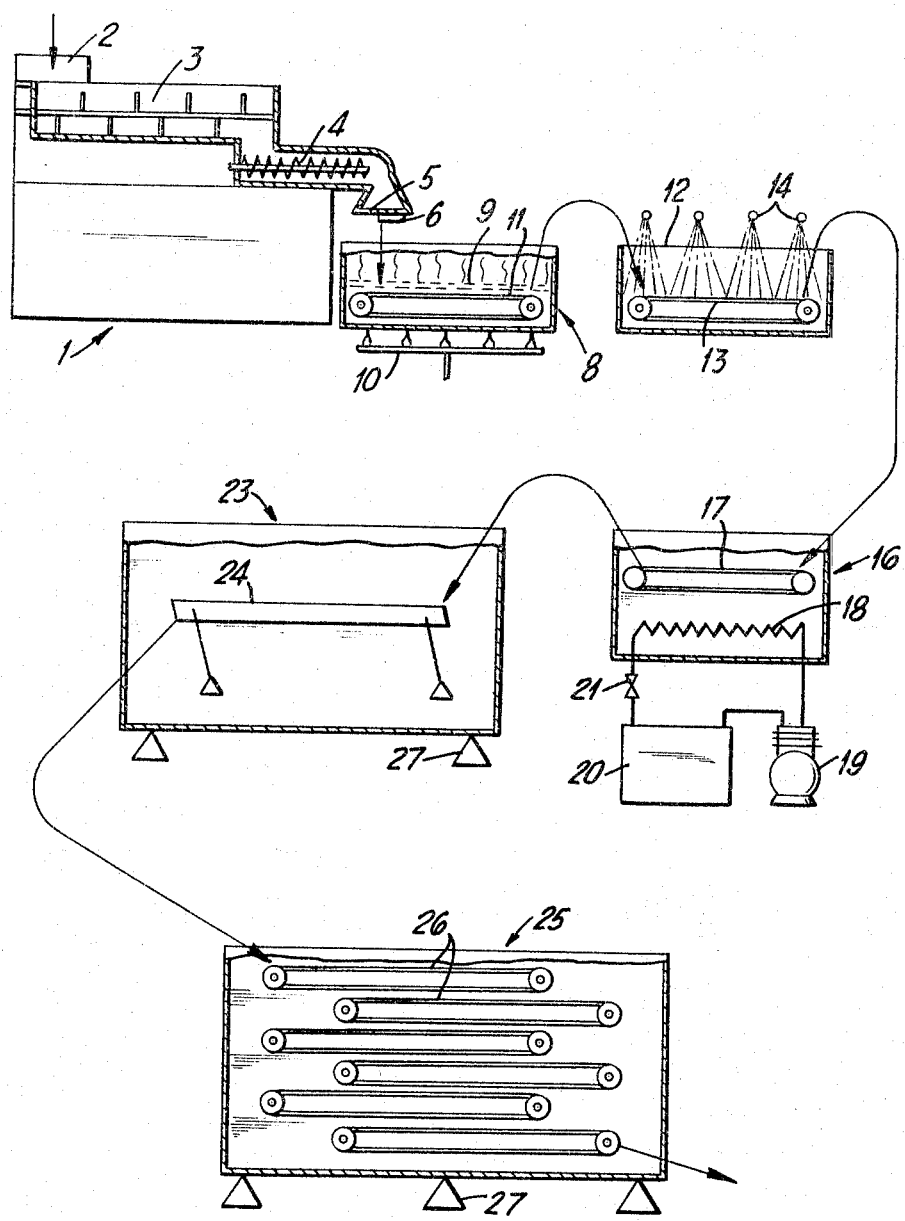

INVENTOR.
ROBERT ERNST

INVENTOR.
ROBERT ERNST

United States Patent Office 3,318,707
Patented May 9, 1967

3,318,707
METHOD FOR MAKING A FOOD PRODUCT FROM AN ALIMENTARY PASTE
Robert Ernst, Sulgen, Switzerland, assignor to Buhler Gebruder, Oberuzwil, Switzerland
Continuation of application Ser. No. 297,608, July 25, 1963. This application Dec. 3, 1965, Ser. No. 517,142
Claims priority, application Switzerland, July 27, 1962, 9,029/62
4 Claims. (Cl. 99—85)

This application is a continuation of my copending application Ser. No. 297,608, filed July 25, 1963, and now abandoned, entitled, "Method and Means for Manufacturing a Food Product."

In the manufacture of alimentary paste food products, such as spaghetti, maccaroni, noodles and the like, it has already been proposed to pre-cook the expressed material at the discharge end of the press in boiling water. This treatment results in a considerable reduction of the subsequent drying time for approximately 20 hours to about 2 hours only. The quality of the finished product and particularly its appearance, its elasticity, the behavior on cooking and the taste are excellent. In cooking, the food product becomes sterilized.

Hitherto this result could be achieved but by individual treatment of the individual pieces. This method was, however, quite unsuitable for industrial application on account of the tendency of the individual pieces to stick together as soon as they come in touch with one another to form unsightly lumps, which do not disintegrate.

A main object of this invention therefore consists in providing means to avoid the above mentioned disadvantages on the one hand, and to take full profit of the great advantages of the subsequent cooking of the material immediately after its extrusion, its rolling and other shaping to the required size and thickness on an industrial scale.

Accordingly, this invention relates to a method of manufacturing a food product of alimentary paste shaped by application of pressure, which is exposed to a cooking process immediately after shaping. According to the invention the method is characterized in that after cooking the shaped product is exposed to a cooling process at a temperature below 0° C.

Owing to the treatment at this low temperature the lumps disintegrate. The individual pieces are very clean and ready for further processing or handling.

By subsequent drying of the pieces thereby obtained, alimentary paste products of a conventional kind or type are obtained. For this commodity the usual moisture can be defined with sufficient accuracy and is accordingly defined in the food legislations of the various countries. In Switzerland, for example, the moisture content should not exceed 13% in the final product. It is also possible to expose the pieces of paste according to this invention and reduce the drying process to obtain a somewhat higher degree humidity than usual in the product which is subsequently baked or fried, whereby a food product of a kind of the so-called "Crackers" is obtained.

In further development of the basic idea of this invention various additions, such as aromatic or other suitable substances may be applied on the fried food product. A rinsing treatment before cooling further enables a reduction of the cooling energy required.

The invention further relates to means for performing said method of manufacturing a food product according to this invention, comprising in consecutive order of succession the following equipment; an alimentary paste mixer, means for shaping alimentary paste by application of pressure, cooking means, cooling means using a cooling agent, and drying means.

This arrangement forms a suitable combination of equipment to conveniently perform the method according to this invention. The various components of the combination are already well known to those skilled in the art, as individual units.

Figure 2:
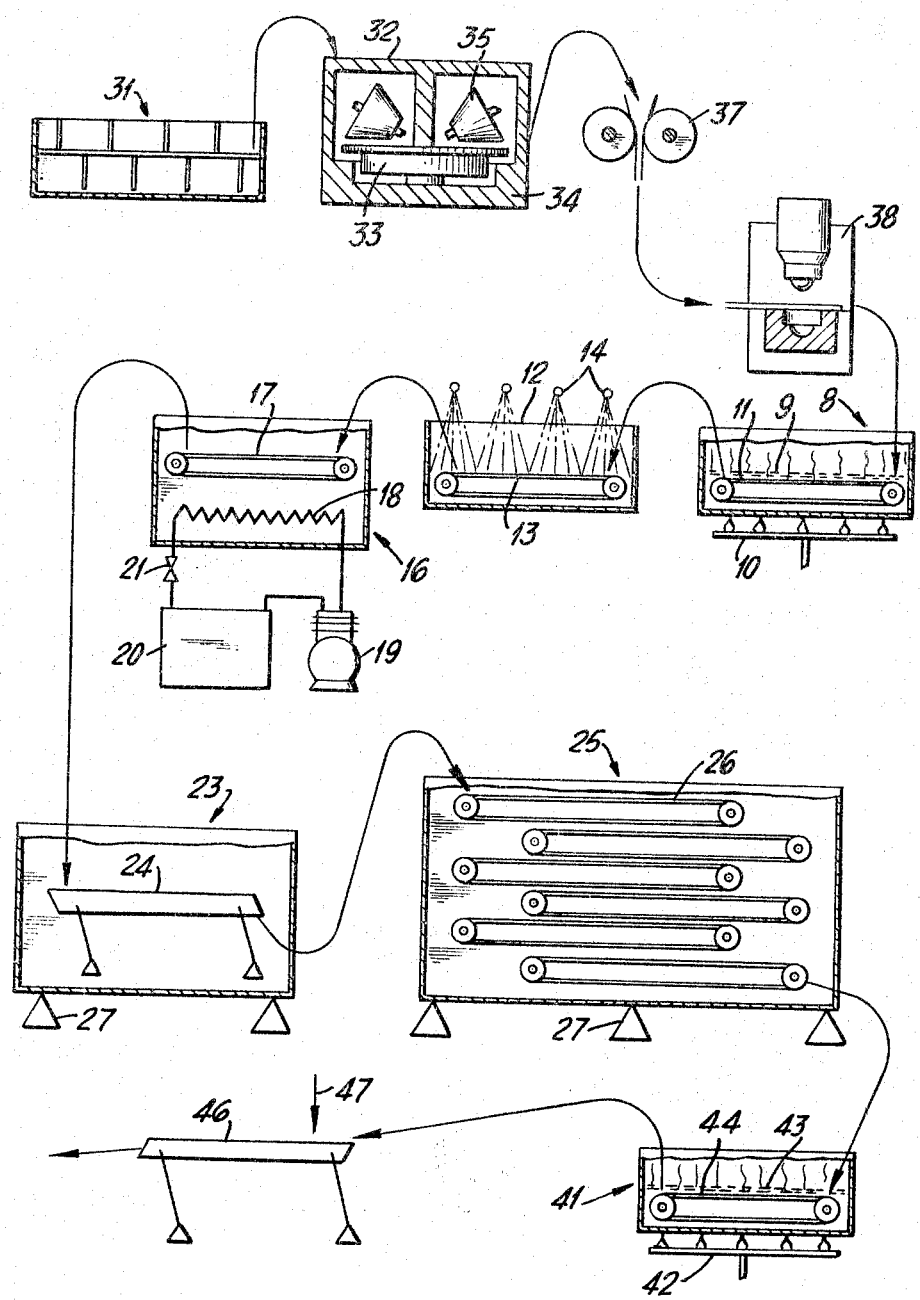

Other objects and advantages as well as further characteristic features of this invention will become evident from the following detailed description of two preferred embodiments with reference to the appended drawing, showing in FIG. 1 the manufacture of conventional type alimentary paste products in a diagrammatic representation, and FIG. 2 the manufacture of so-called "Crackers."

Referring in greater detail to the drawing, FIG. 1 shows an alimentary paste press 1 provided with a dosing feeder 2, a paddle mixer 3, a screw press 4, and a breaker plate 5 having a plurality of passage holes and a rotatable cutting blade 6 suitably disposed therein to cut the expressed material to a desired length.

In a cooker 8, water 9 is heated by means of a heating device 10. The cooker 8 is also provided with conveyor means 11. A rinsing system includes a receptacle or a housing 12 and conveyor means 13 disposed therein below a water supply 14. A cooling chamber 16 includes a housing having conveyor means 17 and an evaporator 18 of a refrigerator unit disposed therein. The refrigerator unit further consists of a compressor 19, a condenser 20 and an expansion valve 21. The drying equipment consists, as often used in conventional drying equipment for usual alimentary paste products, of a shaking dryer unit 23 comprising a shaking chute 24 having a pervious bottom and a multipass drying unit 25 for short goods, provided with a pervious conveyor belt 26 of a type well known in the art. The dryers 23 and 25 are mounted on adjustable supports 27.

The raw materials, such as semolina, water and eventual aromatic or the like taste-improving substances, for example extracts of meat, etc., are introduced through the dosing feeder 2 into the paddle mixer 3 where the paste is prepared and transferred into the screw press 4. The screw press 4 then extrudes the paste at a high pressure through the breaker plate 5. The emerging strands are cut automatically to predetermined length by means of the rotating cutter blade 6, and dropped into the cooker 8, where they are carried through the boiling water 9 by means of the conveyor 11. Immediately after cooking the product is passed to the rinsing unit 12 and flushed with cold water from the water supply 14 until all the starch is removed from the surface, i.e., until the water remains clear. After flushing the product is brought into the cooling chamber 16 and carried therethrough by means of the conveyor 17. Owing to the evaporation of the cooling agent within the evaporator 18, the product, while passing through the cooling chamber 16, is exposed to a temperature below 0° C. In a manner well known by those skilled in the art, the cooling agent is then re-extracted by the compressor 19 at the opposite end of the evaporator 18, compressed for liquification in the condenser 20 and re-circulation through expansion valve 21 into the evaporator 18 again.

The product which has become sticky in the cooker 8 loses its stickiness by the cooling treatment. The product is then transferred to shaking dryer 23 for thawing, whereby the shaking or vibrating chute 24 assists disintegration of the lumps formed during cooking, without damaging thereby the surface of the individual strands. After disintegration the product is delivered to the multipass drying unit 25 for short goods, where an adjustment and an equalization of the moisture contents between the core and the surface layer of the strands as well as a slow final dehydration to the usual or conventional moisture content of 12 to 14% takes place. Outstanding features of the alimentary paste product obtained by this method, already sterilized in the cooker, consist in its good looking or even splendid, vitreous appearance, its exceptional elasticity, the remarkable behaviour in cooking and excellent taste.

Strictly speaking, temperature and duration of the various stages of treatment depend of course on the dimensions, in particular on the thickness of the individual strands or pieces. In general, however, the following data may be considered as approximate average values for conventional treatment in alimentary paste press 1 usually provided with evacuation means:

Cooking at 100° C. _____ min__ 9
Rinsing at 25° C. _____ min__ 1–5
Cooling in the cooling chamber 16 at −25° C.
  min__ 30–45
Thawing and drying in shaking dryer 23 at 40° C.
  min__ 10
Final drying in the short-ware dryer 25 at 90° C.
  hrs__ 2

In the embodiment represented in FIG. 2, the alimentary paste press 1 is substituted by a variety of other machines or equipment, viz. a mixer 31, a rotary pan kneader 32 having a rotary table 33 and a plurality of tapered, indented rolls 35 journalled on stationary shafts disposed in the kneader housing 34, followed by a rolling mill unit 37 and a punching and folding unit 38 provided with a plurality of punches and dies. The dryer unit 25 with the belt conveyor 26 for short goods is followed by a frying unit 41 comprising a heating device 42 and a conveyor means 44 and containing vegetable oil 43. The frying unit 41 is immediately followed by a draining and cooling unit consisting of a shaking chute 46 and provided with dispensing means for various additives, such as aromatic or the like substances, salt, sugar, extracts of soup, etc. These dispensing means, indicated in FIG. 2 of the drawing by an arrow 47, may consist for example of one or more sprayers or sprinklers.

The paste prepared in the mixer 31 is conveniently shaped to a ring of substantial thickness and placed onto the rotary table 33 and kneaded by means of the tapered rolls 35. The strip of paste thereby obtained is passed on to the rolling mill 37 to be rolled into a sheet, which is then transferred to the stamping and folding unit 38, where it is further processed to individual pieces.

These pieces then further pass through the same equipment already described in connection with the second embodiment with reference to FIG. 2 of the drawing, with the difference, however, that the drying process in the multipass dryer 25 for short goods is reduced to obtain a somewhat higher degree of humidity in the product discharged, than in conventional alimentary paste products.

The product obtained then passes to the frying unit 41 to be fried in a light vegetable oil 43 at a relatively high temperature. On the shaking chute 46 to which the product is passed on immediately after frying the excess oil drops off while the product is cooled simultaneously. At 47 the additions are sprayed onto the fried and still hot pieces.

For some products the oil may be kept for example at a temperature of 200° C. and the product processed for 10 seconds. The cooking treatment in boiling water after shaping may also be substituted by either a steaming process or a treatment combining these two.

It has also proved convenient to introduce a vibratory treatment between rinsing and shaking.

Excellent results were further obtained by cooling to such a degree which provokes freezing of at least the moisture contained in the surface layers of the product.

While specific embodiments of the invention have been shown and described in detail to illustrate the application of the inventive principles, it will be understood that the invention may be embodied otherwise without departing from such principles.

What is claimed is:

1. A method for the manufacture of a food product from an alimentary paste, comprising shaping the paste under pressure to form a desirable food product, cooking the shaped product for several minutes at a temperature of about 100° C., rinsing the cooked product for several minutes at a temperature of about 25° C., immediately freezing the cooked shaped food product for about ten minutes, and thereafter drying said frozen food product.

2. A method for the manufacture of a food product from an alimentary paste, comprising shaping the paste under pressure to form a desirable food product shape, cooking the shaped product for several minutes at a temperature of about 100° C., rinsing the cooked product in an aqueous medium for several minutes at a temperature of about 25° C., immediately freezing the said cooked shaped food product, initially drying the said frozen food product by subjecting it to a temperature of around 40° C. for around ten minutes, and thereafter finally drying the dried product at around 90° C. for around two hours.

3. A method of manufacturing a food product from an alimentary paste, comprising subjecting said paste to pressure in order to form it into a desired shape, cooking the shaped food product at a temperature of about 100° C., rinsing the food product with ordinary tap water, immediately after rinsing freezing the food product, and thereafter thawing the product and drying it.

4. A method for the manufacture of a food product from an alimentary paste, comprising shaping the paste under pressure to form a desirable food product, cooking the shaped product for several minutes at a temperature of about 100° C., rinsing the cooked product with ordinary tap water until the rinse water remains clear, immediately freezing the cooked shaped food product, and thereafter drying said frozen food product.

References Cited by the Examiner
UNITED STATES PATENTS 2,615,809 10/1952 Jean _____ 99—85
2,813,796 11/1957 Keneaster et al. _____ 99—80
3,113,869 12/1963 Lee _____ 99—85

A. LOUIS MONACELL, *Primary Examiner.*

RAYMOND N. JONES, *Examiner.*